United States Patent
Ichikawa et al.

(10) Patent No.: US 9,444,111 B2
(45) Date of Patent: Sep. 13, 2016

(54) FUEL CELL SYSTEM

(71) Applicant: Nissan Motor Co., Ltd., Yokohama, Kanagawa (JP)

(72) Inventors: Yasushi Ichikawa, Kanagawa (JP);
Shinichi Makino, Kawasaki (JP);
Ryouichi Shimoi, Yokohama (JP);
Susumu Maeshima, Yokohama (JP);
Hayato Chikugo, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 437 days.

(21) Appl. No.: 13/790,579

(22) Filed: Mar. 8, 2013

(65) Prior Publication Data
US 2014/0080025 A1 Mar. 20, 2014

(30) Foreign Application Priority Data
Mar. 13, 2012 (JP) .................................. 2012-056137

(51) Int. Cl.
*H01M 8/04* (2016.01)

(52) U.S. Cl.
CPC ......... *H01M 8/04104* (2013.01); *H01M 8/045* (2013.01); *H01M 8/04089* (2013.01); *H01M 8/04589* (2013.01); *H01M 8/04753* (2013.01); *H01M 8/04783* (2013.01); *Y02E 60/50* (2013.01); *Y02E 60/521* (2013.01)

(58) Field of Classification Search
CPC .................... H01M 8/04089; H01M 8/04104; H01M 8/045; H01M 8/04589; H01M 8/04753

USPC .......................................................... 429/446
See application file for complete search history.

(56) References Cited

U.S. PATENT DOCUMENTS

| | | | |
|---|---|---|---|
| 2002/0172845 A1* | 11/2002 | Shimada et al. | ................. 429/19 |
| 2003/0141188 A1* | 7/2003 | Imamura et al. | ............. 204/424 |
| 2005/0142400 A1* | 6/2005 | Turco et al. | ..................... 429/13 |
| 2007/0248858 A1* | 10/2007 | Blaszczyk et al. | ............. 429/25 |

FOREIGN PATENT DOCUMENTS

| | | |
|---|---|---|
| JP | 2007-517369 A | 6/2007 |
| JP | 2008-103137 A | 5/2008 |
| JP | 2010-277837 A | 12/2010 |
| JP | 2011-28937 A | 2/2011 |

* cited by examiner

*Primary Examiner* — Jonathan Jelsma
*Assistant Examiner* — Rashid Alam
(74) *Attorney, Agent, or Firm* — Global IP Counselors, LLP

(57) ABSTRACT

A fuel cell system includes a fuel cell, a control valve and a controller. The fuel cell is configured to receive anode gas and cathode gas to generate electric power. The control valve is configured to control pressure of the anode gas being fed to the fuel cell through an anode flow channel. The controller controls the control valve to periodically increase and decrease the pressure of the anode gas flowing through the anode flow channel in an area downstream of the control valve. The controller sets an anode pressure differential value for the anode gas resulting from periodic increasing and decreasing of the pressure of the anode gas based on a requested fuel cell output. The controller determines a quantity of liquid in the anode flow channel. The controller decreases the anode pressure differential value that was set based on the requested fuel cell output.

22 Claims, 12 Drawing Sheets

FUEL CELL SYSTEM

CROSS-REFERENCE TO RELATED APPLICATIONS

This application claims priority to Japanese Patent Application No. 2012-056137, filed in Japan on Mar. 13, 2012. The entire disclosure of Japanese Patent Application No. 2012-056137 is hereby incorporated herein by reference.

BACKGROUND

1. Field of the Invention

The present invention generally relates to a fuel cell system.

2. Background Information

Some conventional fuel cell systems are controlled to purge the fuel cells of water and accumulated non-reactive gases. An example of such a conventional fuel cell system is disclosed in Japanese PCT National Stage Publication No. 2007-517369. In this conventional fuel cell system, a normally closed solenoid valve is arranged in an anode gas feeding path to the fuel cell and a normally opened solenoid valve is arranged in an anode-off gas exhausting path between the fuel cell and a recycle (buffer) tank. Thus, the normally closed solenoid valve, the normally opened solenoid valve and the recycle (buffer) tank are arranged sequentially in such a conventional fuel cell system. In this fuel cell system, the unused anode-off gas that is discharged to the anode-off gas exhausting path is not returned to an anode gas feeding path. In other words, this fuel cell system is an anode-off gas non-circulating-type fuel cell system. In this fuel cell system, the normally closed solenoid valve and the normally opened solenoid valve are opened and closed periodically.

SUMMARY

In the above mentioned fuel cell system, as the normally closed solenoid valve and the normally opened solenoid valve are opened and closed periodically, the pressure in an anode system also varies periodically. As a result of this pressure fluctuation, a load is repeatedly applied on the membrane electrode assembly (MEA) in the fuel cells.

One object of the present invention is to provide a technology, whereby the difference between the increased pressure and the decreased pressure is decreased when the anode gas pressure is periodically increased and decreased corresponding to the condition of the fuel cells in a fuel cell system where the anode gas pressure is periodically increased and decreased.

In view of the above, a fuel cell system is provided that basically comprises a fuel cell, a control valve and a controller. The fuel cell is configured to receive anode gas and cathode gas to generate electric power. The control valve is configured to control pressure of the anode gas being fed to the fuel cell through an anode flow channel. The controller is programmed to control the control valve to periodically increase and decrease the pressure of the anode gas flowing through the anode flow channel in an area downstream of the control valve. The controller is further programmed to set an anode pressure differential value for the anode gas resulting from periodic increasing and decreasing of the pressure of the anode gas based on a requested fuel cell output. The controller is further programmed to determine a quantity of liquid in the anode flow channel. The controller is further programmed to decrease the anode pressure differential value that was set based on the requested fuel cell output.

According to the present invention, for the fuel cell system where the pressure of the anode gas is controlled to increase and decrease periodically, when the quantity of liquid in the anode flow channel is smaller, the repeated load applied on the members in the fuel cells can be suppressed.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1A:
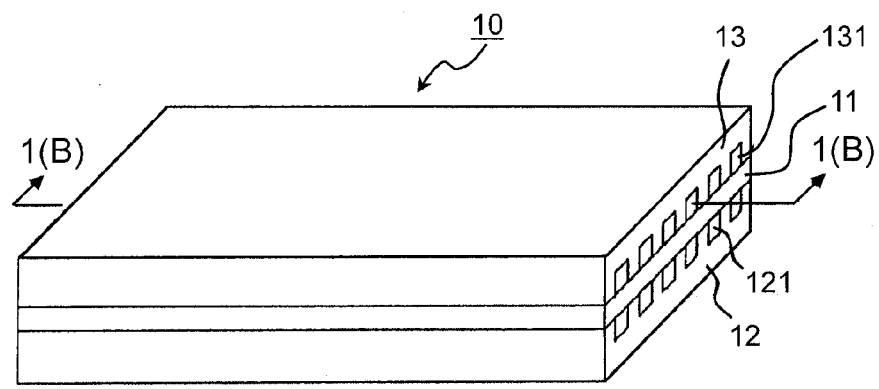
FIG. 1(A) is a simplified perspective view of a fuel cell in accordance with a first embodiment.
Figure 1B:
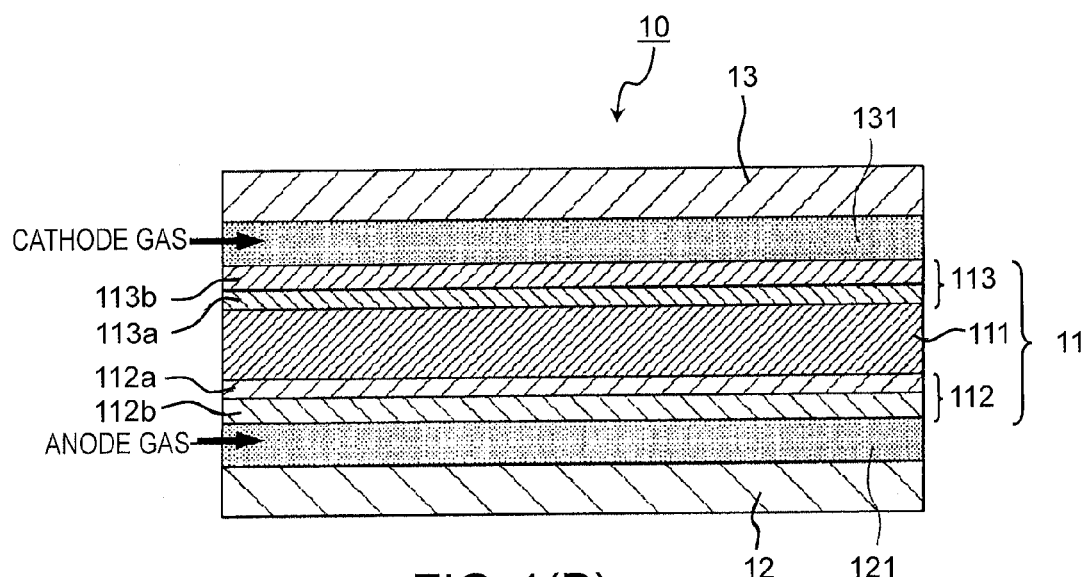
FIG. 1(B) is a simplified cross sectional view of the fuel cell that is illustrated in FIG. 1(A) as seen along section line 1(B)-1(B)

Referring initially to FIGS. 1(A) and (B), a fuel cell 10 is illustrated in accordance with a first embodiment. FIGS. 1(A) and 1(B) are diagrams explaining a basic configuration of a fuel cell system in the first embodiment. FIG. 1(A) is an oblique view of the fuel cell 10. FIG. 1(B) is a cross-sectional view of the fuel cell in FIG. 1(A) as viewed along section line 1(B)-1(B).

The fuel cell 10 has an electrolyte membrane sandwiched between an anode electrode (the fuel electrode) and a cathode electrode (the oxidizer electrode). Each fuel cell generates electric power when an anode gas (fuel gas) containing hydrogen is fed to the anode electrode and a cathode gas (oxidizer gas) containing oxygen is fed to the cathode electrode. The electrode reaction that develops in both electrodes of the anode electrode and the cathode electrode is as follows.

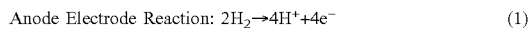

Anode Electrode Reaction: $2H_2 \rightarrow 4H^+ + 4e^-$ (1)

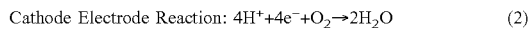

Cathode Electrode Reaction: $4H^+ + 4e^- + O_2 \rightarrow 2H_2O$ (2)

Each fuel cell generates about 1 volt of electromotive force by the electrode reactions in equations (1) and (2).

The fuel cell 10 has a configuration in which an anode separator 12 and the cathode separator 13 are arranged on the front surface and the rear surface of the membrane electrode assembly 11 (hereinafter to be referred to as the "MEA 11"), respectively. The MEA 11 includes an electrolyte membrane 111, an anode electrode 112 and a cathode electrode 113. The MEA 11 is arranged with the anode electrode 112 on one surface of the electrolyte membrane 111 and the cathode electrode 113 on the other surface. The electrolyte membrane 111 is a proton conductive ion exchange membrane made of a fluororesin. The electrolyte membrane 111 displays good electroconductivity in the wet state.

The anode electrode 112 includes a catalyst layer 112a and a gas diffusion layer 112b. The catalyst layer 112a is in contact with the electrolyte membrane 111. The catalyst layer 112a is formed from platinum or carbon black particles containing platinum, etc. The gas diffusion layer 112b is arranged on the outer side (the side facing away from the electrolyte membrane 111) of the catalyst layer 112a. The gas diffusion layer 112b is in contact with the anode separator 12. The gas diffusion layer 112b is formed from a material with a sufficiently high gas diffusion property and electroconductivity. For example, the gas diffusion layer 112b can be formed from a carbon cloth woven from yarns made of carbon fibers or a carbon paper.

Similar to the anode electrode 112, the cathode electrode 113 also includes a catalyst layer 113a and a gas diffusion layer 113b.

The anode separator 12 is in contact with the gas diffusion layer 112b. The anode separator 12 has a plurality of a plurality of groove-shaped anode gas flow channels 121 on the side in contact with the gas diffusion layer 112b for feeding anode gas to the anode electrode 112.

The cathode separator 13 is in contact with the gas diffusion layer 113b. The cathode separator 13 has a plurality of groove-shaped cathode gas flow channels 131 on the side in contact with the gas diffusion layer 113b for feeding the cathode gas to the cathode electrode 113.

The anode gas flowing in the anode gas flow channels 121 and the cathode gas flowing in the cathode gas flow channel 131 can flow parallel with each other in the same direction, or they can flow parallel with each other yet opposite directions from each other. In addition, they can also flow orthogonal to each other.

When the fuel cell 10 is used as a power source on a vehicle, hundreds of fuel cells 10 are stacked to form a fuel cell stack to meet the high power requirement. Here, a fuel cell system is formed for feeding the anode gas and the cathode gas to the fuel cell stack, and the electric power for driving the vehicle is output from the fuel cell stack.

Figure 2:
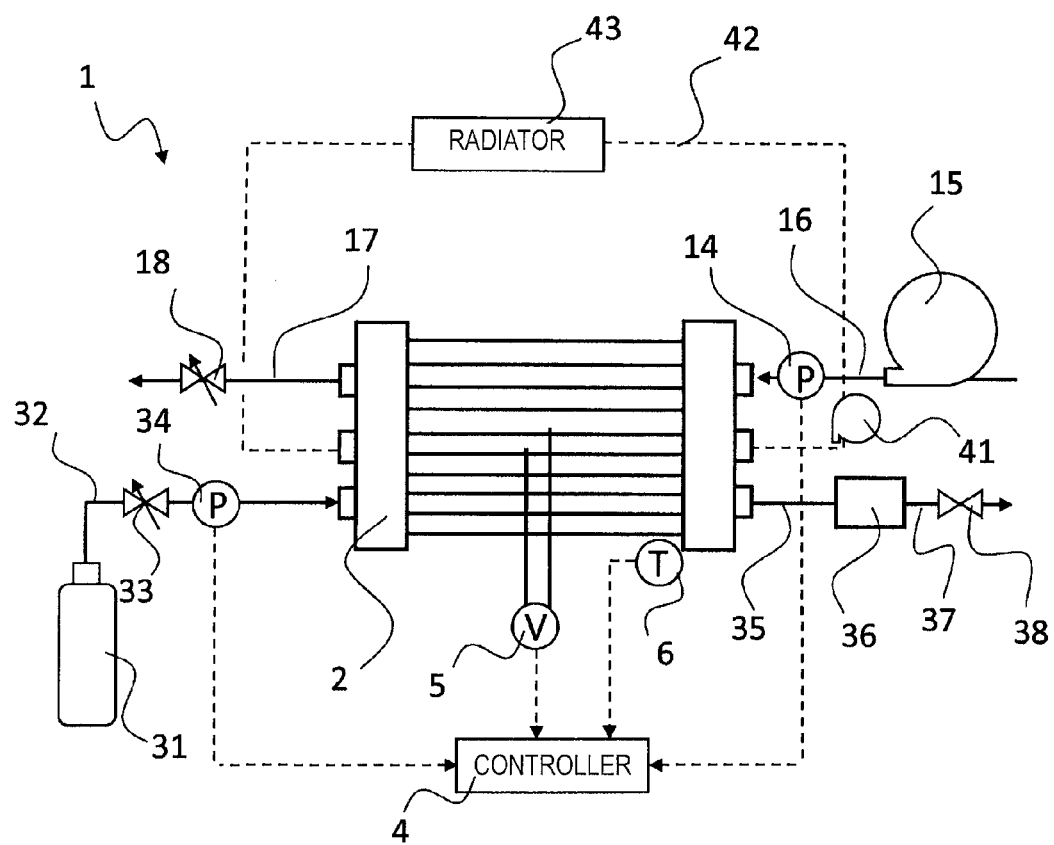
FIG. 2 is a schematic diagram illustrating the anode-off gas non-circulating-type fuel cell system in accordance with the first embodiment.

FIG. 2 is a schematic block diagram illustrating the configuration of an anode non-circulation type fuel cell system in accordance with the first embodiment. An anode non-circulation type fuel cell system supplies an anode gas (hydrogen gas) to the fuel cell stack without circulating the anode gas (hydrogen gas).

The fuel cell stack 2 is prepared by stacking a plurality of (hundreds) of the fuel cells 10. As the anode gas and the cathode gas are fed to the fuel stack, the fuel stack generates the electric power needed for driving the vehicle (such as the electric power needed for driving the motor). According to the present embodiment, air is used as the cathode gas.

A high-pressure tank 31 is provided to store the high-pressure anode gas (hydrogen). The anode gas of the high-pressure tank 31 is fed via an anode gas feeding pipeline 32 (the fuel gas feeding flow channel) to the anode of the fuel cell stack 2. Here, instead of the high-pressure tank 31, hydrogen can be produced according to a modification reaction that uses alcohol, hydrocarbon, or the like as the raw feed material.

A pressure adjusting valve 33 is arranged in the anode gas feeding pipeline 32 for adjusting the feeding rate of the anode gas. The pressure adjusting valve 33 is, for example, an electromagnetic valve for continuous or stepwise adjustment of the opening degree. The opening degree of the pressure adjusting valve 33 is controlled by a controller 4. The pressure adjusting valve 33 constitutes an example of a control valve.

A pressure sensor 34 is arranged in the anode gas feeding pipeline 32 at a location downstream from the pressure adjusting valve 33. The pressure sensor 34 detects the pressure of the anode gas flowing in the anode gas feeding pipeline 32 at a location downstream from the pressure adjusting valve 33. In the present embodiment, the pressure of the anode gas (hereinafter referred to as the "anode pressure") detected with this pressure sensor 34 is a substitute for the pressure of the entire anode system that includes the anode gas flow channels 121 and a buffer tank 36 inside of the fuel cell stack.

An anode gas exhausting pipeline 35 has one end portion connected to the anode gas outlet hole of the fuel cell stack 2 and the other end portion connected to the upper portion of the buffer tank 36 (e.g., a buffer component). The anode gas exhausting pipeline 35 exhausts the excessive anode gas not used in the electrode reaction, a gas mixture of nitrogen and hydrogen, and other impurity gas (hereinafter to be referred to as "anode-off gas") cross-leaked from the cathode side to the anode gas flow channels 121. Also the anode gas exhausting pipeline 35 exhausts the liquid condensed inside of the fuel cell stack 2.

The buffer tank 36 temporarily stores the anode-off gas flown through the anode gas exhausting pipeline 35. A portion of the steam in the anode-off gas is condensed in the buffer tank 36 to liquid that is then separated from the anode-off gas.

The purge path 37 has one end portion connected to the lower portion of the buffer tank 36. The other end portion of the purge path 37 is an open end. The anode-off gas and the liquid staying in the buffer tank 36 are then exhausted through the purge path 37 and from the open end to the outside air (ambient atmosphere).

A purge valve 38 is provided in the purge path 37. The purge valve 38 is an electromagnetic valve that continuously or stepwise adjusts the opening degree. The opening degree is adjusted under control by the controller 4. The amount of anode-off gas exhausted to the outside air through the purge path 37 from the buffer tank 36 is controlled by adjusting the opening of the purge valve 38 so that the anode gas concentration in the buffer tank 36 is kept within a prescribed range. The reason for this operation is as follows: if the anode gas concentration is too high in the buffer tank 36, the rate of the anode gas exhausted from the buffer tank 36 through the purge path 37 to the ambient atmosphere is increased, and creates a waste. On the other hand, if the concentration is too low, the fuel becomes insufficient to generate electric power, and the catalyst degrades.

The cathode gas (air) is fed from a compressor 15 via the feeding pipe 16 to the cathode of the fuel cell stack 2. It is possible to use an air feeding means such as a blower or the like instead of the compressor. A pressure sensor 14 is arranged in the feeding pipe 16 to detect the pressure of the cathode gas. The cathode gas exhausted from the cathode of the fuel cell stack 2 is released via the exhaust pipe 17 to the atmosphere. A pressure adjusting valve 18 is arranged in the exhaust pipe 17 for regulating the back pressure (the pressure in the cathode gas flow channel).

The cooling water is fed to the fuel cell stack 2 via a cooling water pipe 42 from a radiator 43. The temperature of the cooling water is increased by taking in the heat that was generated in the fuel cell stack 2. The cooling water is then fed via the cooling water pipe 42 to the radiator 43 where the cooling water is cooled. The cooling water is then recirculated back into the fuel cell stack 2. A cooling water pump 41 is arranged in the cooling water pipe 42 for circulating the water. A temperature sensor 6 detects the temperature of the cooling water that has been increased due to the heat taken from the fuel cell stack 2 that generates the heat.

The controller 4 includes a microcomputer that comprises a Central Processing Unit (CPU), a Read Only Memory (ROM), a Random Access Memory (RAM) and an input/output interface (I/O interface).

The controller 4 receives various signals for indicating the operational status of the fuel cell system 1. In other words, various sensors detect various parameters of the operation state of the fuel cell system 1 and signals from these sensors are input to the controller 4. A pressure sensor 34 is provided to detect the anode pressure, and outputs a signal to the controller 4 for indicating the anode pressure. A pressure sensor 14 is provided to detect the cathode pressure, and outputs a signal to the controller 4 for indicating the cathode pressure. A voltage sensor 5 is provided to detect the voltage of the fuel cell stack 10, and outputs a signal to the controller 4 for indicating the voltage of the fuel cell stack 10. The temperature sensor 6 detects the temperature of the cooling water and outputs a signal to the controller 4 for indicating the cooling water temperature.

Based on these input signals, the controller 4 executes a pulsation operation. In particular, the controller 4 periodically increases and decreases the anode pressure by periodically opening and closing the pressure adjusting valve 33. Also the controller 4 adjusts the opening degree of the purge valve 38 to regulate the flow rate of the anode-off gas exhausted from the buffer tank 36 and to maintain the anode gas concentration in the buffer tank 36 below a prescribed level.

The controller 4 also determines the quantity of liquid in the anode flow channel, and the controller 4 operates a control so that, when the quantity of liquid in the anode flow channel becomes smaller, the difference between the increased pressure and the decreased pressure of the anode pressure in the pulsation operation is decreased as explained later.

In the case of an anode gas non-circulating-type fuel cell system 1, the anode gas is continually fed from the high-pressure tank 31 to the fuel cell stack 2 while the pressure adjusting valve 33 is opened as is. As a result, the anode-off gas containing the unused anode gas exhausted from the fuel cell stack 2 is exhausted from the buffer tank 36 to the outside air through the purge path 37. This results in waste.

Therefore, according to the present embodiment, the pressure adjusting valve 33 is periodically opened and closed by the controller 4, so that the anode pressure is periodically increased and decreased to perform the pulsation operation. When the pulsation operation is carried out, the anode-off gas staying in the buffer tank 36 flows back in the fuel cell stack 2 when the anode pressure decreases. As a result, it is possible to reuse the anode gas in the anode-off gas, so that decreasing the anode gas quantity exhausted to the ambient atmosphere is possible. As a result, waste can be prevented.

Figure 3:
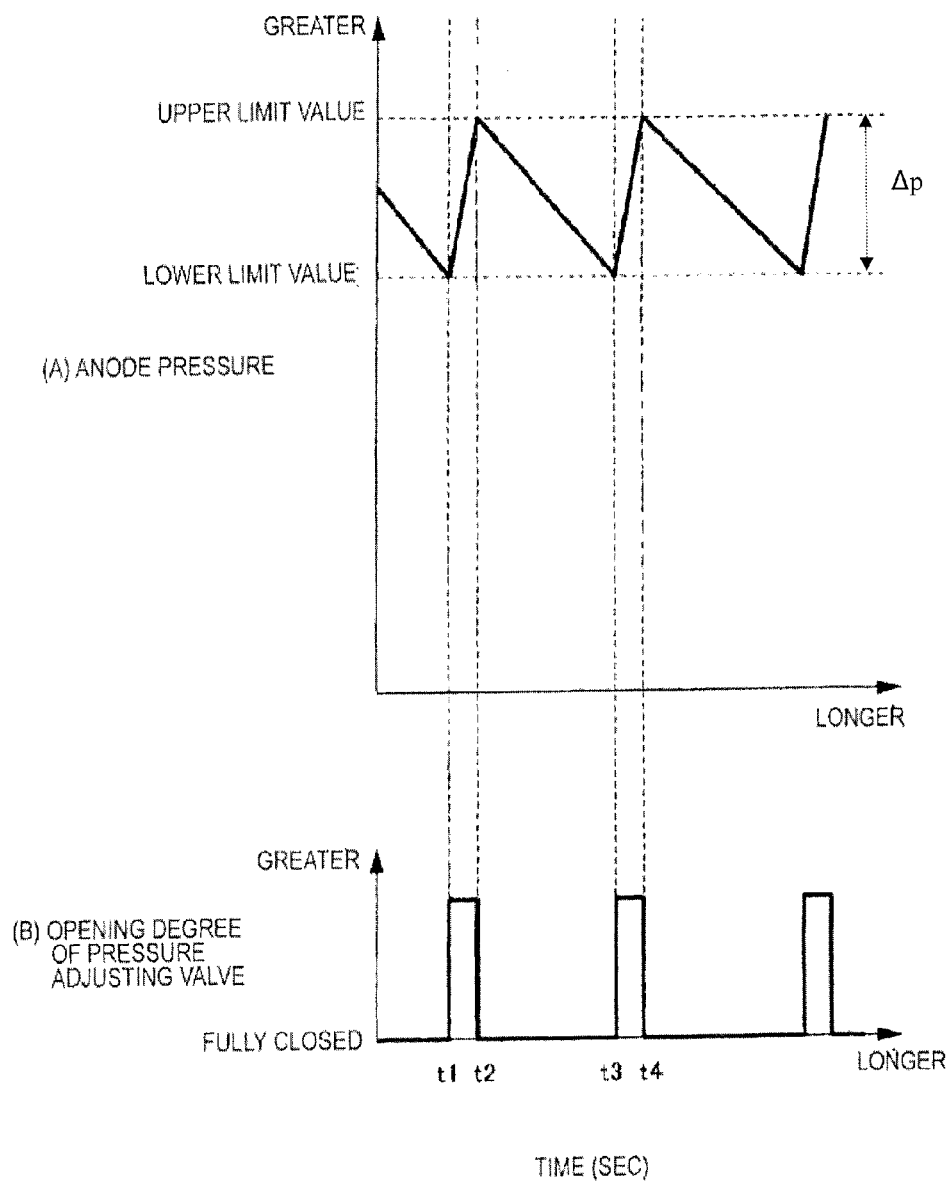
FIG. 3 is a diagram illustrating the pulsation operation when the operation state of the fuel cell system is steady.

FIG. 3 includes diagrams illustrating the pulsation operation when the operation state of the fuel cell system 1 is in a steady state.

As shown in the upper portion (A) of FIG. 3, the controller 4 computes the target output of the fuel cell stack 2 based on the operation state of the fuel cell system 1 (the load of the fuel cell stack). The controller 4 sets the upper limit value and the lower limit value of the anode pressure corresponding to the target output. Then, the anode pressure is increased and decreased periodically between the set upper limit value and the lower limit value for the anode pressure.

More specifically, when the anode pressure reaches the lower limit value at time t1, as shown in the lower portion (B) of FIG. 3, the pressure adjusting valve 33 is opened to the opening degree which at least allows the anode pressure to be increased to the upper limit value. In this state, the anode gas is fed from the high pressure tank 31 to the fuel cell stack 2, and the anode gas is exhausted from the buffer tank 36.

If the anode pressure reaches the upper limit value at time t2, as shown in the lower portion (B) of FIG. 3, the pressure adjusting valve 33 is fully closed, so that supply of the anode gas from the high-pressure tank 31 to the fuel cell stack 2 is shut down. As a result, due to the aforementioned electrode reaction of Equation (1), the anode gas left in the anode gas flow channels 121 inside of the fuel cell stack is used up over time, so that the anode pressure decreases corresponding to the consumption of the anode gas.

As the residual anode gas left in the anode gas flow channels 121 is consumed, the pressure in the buffer tank 36 is temporarily higher than the pressure in the anode gas flow channels 121, so that the anode-off gas flows back from the buffer tank 36 to the anode gas flow channels 121. As a result, the residual anode gas left in the anode gas flow channels 121 and the anode gas in the anode-off gas back flown to the anode gas flow channels 121 are consumed over time, and the anode gas pressure further decreases.

When the anode pressure reaches the lower limit value at time t3, the pressure adjusting valve 33 is opened in the same manner as at time t1. Then, when the anode pressure reaches the upper limit value again at time t4, the pressure adjusting valve 33 is fully closed.

As explained above, for the fuel cell system in which the pulsation operation is carried out with the anode pressure periodically increased/decreased, the load is repeatedly applied on the MEA 11. In particular, according to the present embodiment, the MEA 11 is connected to the diffuser connected with the anode gas feeding pipeline 32 and the anode gas exhausting pipeline 35. In the pulsation operation, a stress is generated at the connecting portion between the MEA 11 and the diffuser. In order to relax the stress generated at the connecting portion between the MEA 11 and the diffuser, the pressure differential between the increased pressure and the decreased pressure of the anode pressure is preferred to be smaller in the pulsation operation.

For the fuel cell system in the first embodiment, the smaller that as the quantity of liquid in the anode flow channel becomes smaller, the pressure differential between the increased pressure and the decreased pressure of the anode pressure will also become smaller.

Figure 4:
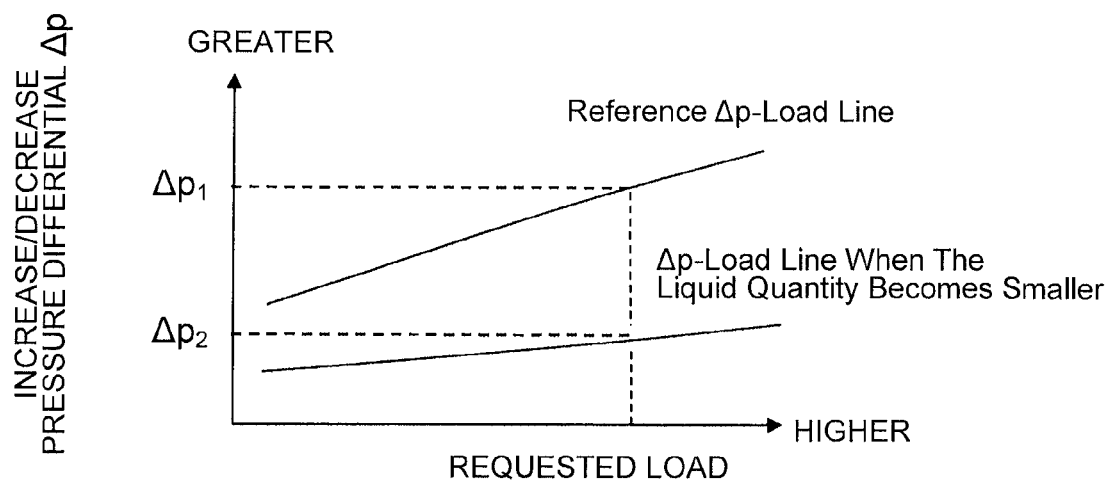
FIG. 4 is a graph conceptually illustrating the relationship of the increase/decrease pressure differential $\Delta p$ versus the magnitude of the load requested on the system in the pulsation operation to illustrate a reference line of the $\Delta p$-load line and a $\Delta p$-load line when the quantity of liquid is smaller.

FIG. 4 is a graph illustrating the reference line of the $\Delta p$-load line and the $\Delta p$-load line when the quantity of liquid is smaller based on the relationship of the increase/decrease pressure differential $\Delta p$ versus the magnitude of the load requested on the system in the pulsation operation. The reference line of the $\Delta p$-load line is preset in advance. As shown in FIG. 4, the increase/decrease pressure differential $\Delta p$ of the anode pressure in the pulsation operation is set larger when the requested load is higher. Also, even when the requested load is the same, if the quantity of liquid in the anode flow channel is smaller, for example, when the quantity of liquid in the anode flow channel becomes less than a prescribed quantity, the increase/decrease pressure differential $\Delta p$ of the anode pressure is smaller.

The controller 4 determines the quantity of liquid in the anode flow channel. In the following, an explanation will be provided and based on an example in which the quantity of liquid in the anode flow channel is determined based on the temperature of the fuel cell stack 2 and an example in which the quantity of liquid in the anode flow channel is determined based on the internal resistance (the impedance) of the fuel cell stack 2. However, the method for determining the quantity of liquid in the anode flow channel is not limited to the methods discussed in these examples.

Figure 5:
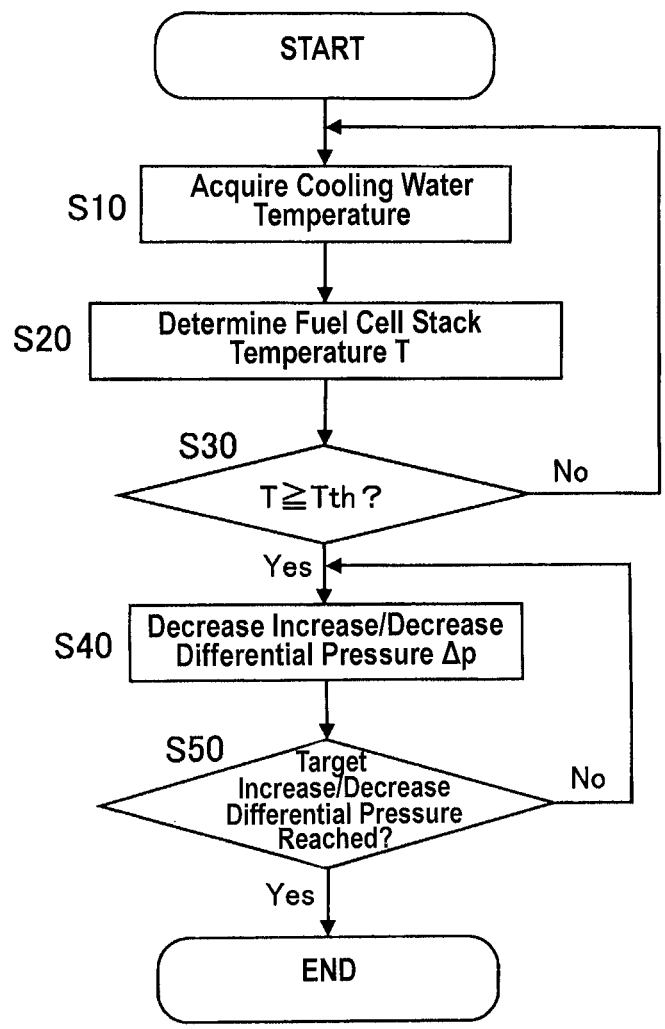
FIG. 5 is a flow chart illustrating a process executed by the controller of the fuel cell system of the first embodiment, where the quantity of liquid in the anode flow channel is determined based on the temperature of the fuel cell stack, and control is carried out to decrease the increase/decrease pressure differential $\Delta p$ of the anode pressure.

FIG. 5 is a flow chart illustrating a control process executed by the controller 4 in the fuel cell system of the first embodiment, where the quantity of liquid in the anode flow channel is determined based on the temperature of the fuel cell stack 2, and control is carried out to decrease the increase/decrease pressure differential $\Delta p$ of the anode pressure. At the time for starting the process in step S10, the increase/decrease pressure differential $\Delta p$ of the anode pressure is set at a reference value (see the $\Delta p$-load line in FIG. 4).

In step S10, the temperature of the cooling water detected by the temperature sensor 6 is acquired.

In step S20, based on the temperature of the cooling water acquired in step S10, the temperature T of the fuel cell stack 2 is determined.

Figure 6:
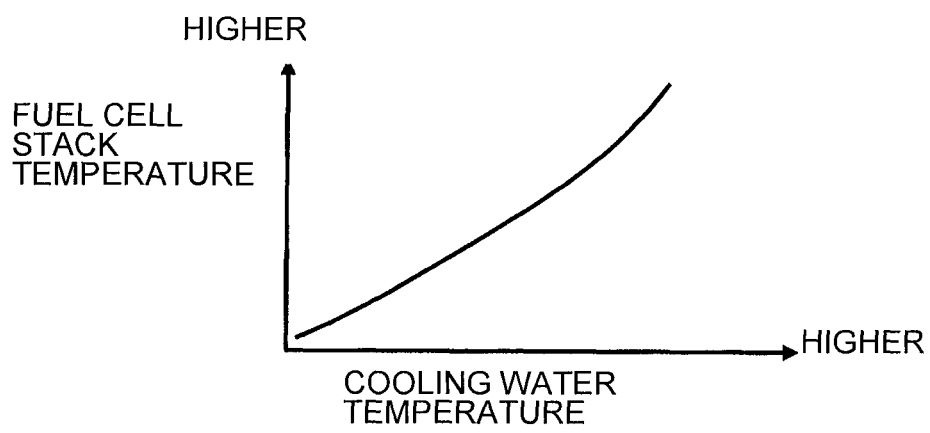
FIG. 6 is a graph conceptually illustrating an example of the relationship between the temperature of the cooling water and the temperature of the fuel cell stack.

FIG. 6 is a diagram illustrating an example of the relationship between the temperature of the cooling water and the temperature of the fuel cell stack 2. The controller 4 has a map of the relationship shown in FIG. 6. Based on this map and the temperature of the cooling water acquired in step S10, the temperature T of the fuel cell stack 2 is determined.

In step S30, a determination is made regarding whether the temperature T of the fuel cell stack 2 determined in step S20 is over the prescribed temperature Tth. The higher the temperature of the fuel cell stack 2 is, the less the quantity of liquid there will be in the anode flow channel. Here, when the temperature T of the fuel cell stack 2 is over the prescribed temperature Tth, a determination is made that the quantity of liquid in the anode flow channel is less than a prescribed quantity. If the temperature T of the fuel cell stack 2 is lower than the prescribed temperature Tth, a determination is made that the quantity of liquid in the anode flow channel is less than the prescribed quantity, and, without adjusting the increase/decrease pressure differential $\Delta p$ of the anode pressure, the operation returns to step S10. On the other hand, if the temperature T of the fuel cell stack 2 is over the prescribed temperature Tth, a determination is made that the quantity of liquid in the anode flow channel is less than the prescribed quantity, and the process proceeds to step S40.

In step S40, the increase/decrease pressure differential $\Delta p$ of the anode pressure is decreased. For example, by decreasing the upper limit value when the anode pressure is increased and decreased periodically, the increase/decrease pressure differential $\Delta p$ is decreased.

In step S50, a determination is made regarding whether the decreased increase/decrease pressure differential $\Delta p$ of the anode pressure has reached the target difference between the increased pressure and the decreased pressure (the $\Delta p$-load line when the quantity of liquid is small as shown in FIG. 4). If a determination is made that the increase/decrease pressure differential $\Delta p$ of the anode pressure has not reached the target difference between the increased pressure and the decreased pressure, the operation returns to step S40, and the increase/decrease pressure differential $\Delta p$ is further decreased. On the other hand, if a determination is made that the increase/decrease pressure differential $\Delta p$ of the anode pressure has reached the target difference between the increased pressure and the decreased pressure, the process of the flow chart comes to an end.

In addition, although not shown in the flow chart, if the temperature T of the fuel cell stack 2 is lower than the prescribed temperature Tth after the increase/decrease pressure differential $\Delta p$ of the anode pressure is decreased, a determination is made that the quantity of liquid in the anode flow channel is more than the prescribed quantity and that the increase/decrease pressure differential $\Delta p$ of the anode pressure is reset to the reference value (the reference $\Delta p$-load line as shown in FIG. 4).

Figure 7:
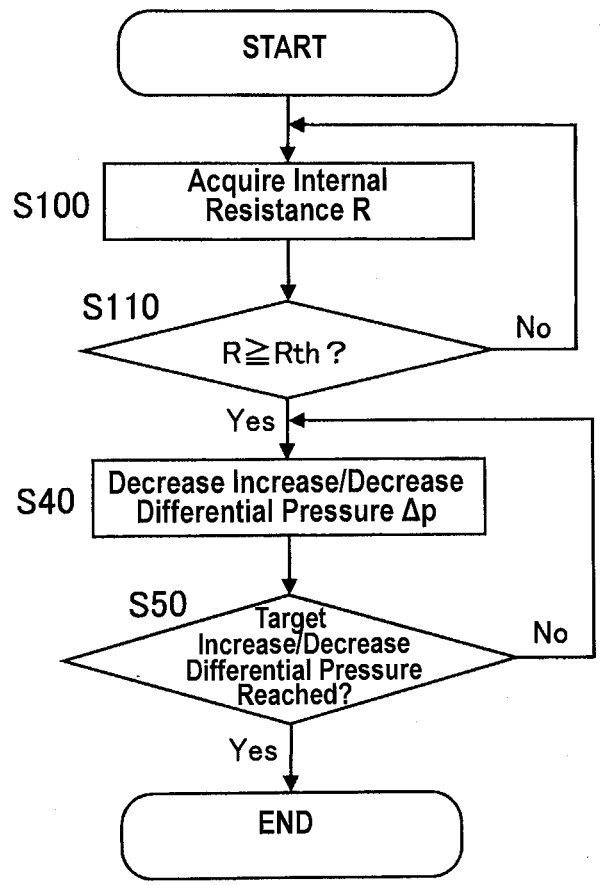
FIG. 7 is a flow chart illustrating a process executed by the controller of the fuel cell system of the first embodiment, where the quantity of liquid in the anode flow channel is determined based on the internal resistance of the fuel cell stack, and a control is carried out to decrease the increase/ decrease pressure differential $\Delta p$ of the anode pressure.

FIG. 7 is a flow chart illustrating the control process executed by the controller 4 of the fuel cell system of the first embodiment, wherein the quantity of liquid in the anode flow channel is determined based on the internal resistance of the fuel cell stack 2, and the control is carried out to decrease the increase/decrease pressure differential $\Delta p$ of the anode pressure. The same reference numerals as those in the flow chart shown in FIG. 5 are used to represent the same steps of the operation, and they will not be explained in detail again.

In step S100, the internal resistance R of the fuel cell stack 2 is determined. Here, the internal resistance R may be measured by an impedance measurement device not shown in the Figure, or the internal resistance may be computed using a well-known method.

In step S110, a determination is made regarding whether the internal resistance R determined in step S100 is over a prescribed resistance Rth. The higher the internal resistance of the fuel cell stack 2 is, the less the quantity of liquid there will be in the anode flow channel. Here, when the internal resistance R of the fuel cell stack 2 is lower than the prescribed resistance Rth, a determination is made that the quantity of liquid in the anode flow channel is over a prescribed quantity, and the operation returns to step S100 without changing the increase/decrease pressure differential Δp of the anode pressure. On the other hand, if the internal resistance R of the fuel cell stack 2 is over the prescribed resistance Rth, a determination is made that the quantity of liquid in the anode flow channel is less than the prescribed quantity, and the process proceeds to step S40.

In step S40, the increase/decrease pressure differential Δp of the anode pressure is decreased.

In step S50, a determination is made regarding whether the decreased increase/decrease pressure differential Δp of the anode pressure has reached the target difference between the increased pressure and the decreased pressure. If a determination has been made that the target difference between the increased pressure and the decreased pressure has not been reached, the operation returns to step S40. On the other hand, if a determination is made that the target difference between the increased pressure and the decreased pressure has been reached, the process of the flow chart comes to an end.

In addition, although not shown in the flow chart, if the internal resistance R of the fuel cell stack 2 is lower than the prescribed resistance Rth after the increase/decrease pressure differential Δp of the anode pressure is decreased, a determination is made that the quantity of liquid in the anode flow channel is more than the prescribed quantity, and the increase/decrease pressure differential Δp of the anode pressure is reset to the reference value (the reference Δp-load line as shown in FIG. 6).

Figure 8:
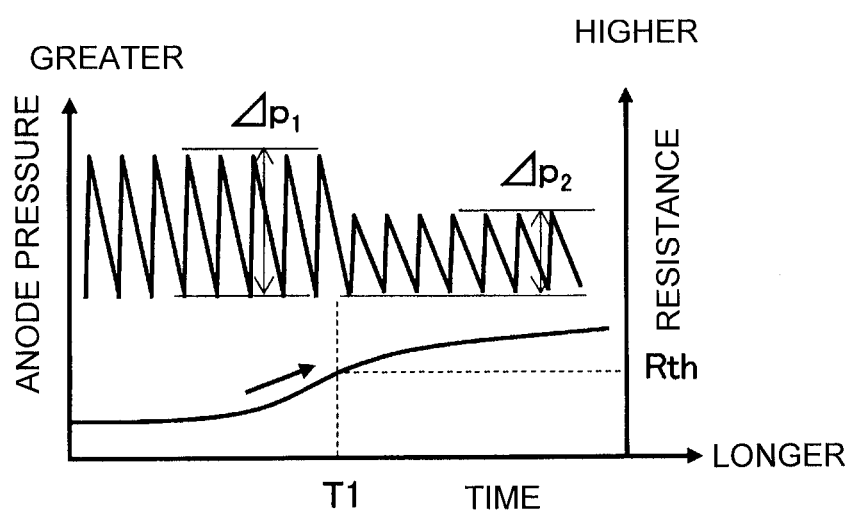
FIG. 8 is a graph conceptually illustrating the time variation of the anode pressure and the time variation of the internal resistance R of the fuel cell stack.

FIG. 8 is a graph illustrating the time variation of the anode pressure and the time variation of the internal resistance R of the fuel cell stack 2. At time T1 in the example shown in FIG. 8, the internal resistance R of the fuel cell stack 2 becomes over the prescribed resistance Rth. Consequently, by decreasing the upper limit value of the anode pressure during the pulsation operation, the increase/decrease pressure differential Δp of the anode pressure is decreased from Δp1 to Δp2.

As explained above, for the fuel cell system in the first embodiment, corresponding to the output requested on the fuel cells, the difference between the increased pressure and the decreased pressure is set when the pressure of the anode gas is periodically increased and decreased in this fuel cell system. The quantity of liquid in the anode flow channel is determined. When the quantity of liquid in the anode flow channel becomes smaller, the difference between the increased pressure and the decreased pressure set corresponding to the output requested on the fuel cells is decreased. When the quantity of liquid in the anode flow channel is smaller, there is no need to increase the difference between the increased pressure and the decreased pressure for exhausting the liquid. Consequently, by decreasing the difference between the increased pressure and the decreased pressure, it is possible to suppress the application of the load repeatedly on the MEA 11. That is, by decreasing the difference between the increased pressure and the decreased pressure at a high temperature condition so that the quantity of liquid in the anode flow channel becomes smaller, even when the strength of the MEA 11 and other members weakens at a high temperature, suppressing degradation in the durability of the MEA 11, etc. is still possible.

In particular, for the fuel cell system in the first embodiment, the higher that the temperature of the fuel cells is, the smaller that the quantity of liquid in the anode flow channel is determined to be. That is, as the temperature of the fuel cells increases, the difference between the increased pressure and the decreased pressure set corresponding to the output requested on the fuel cells is decreased. Consequently, although the strength of the MEA 11 and other members is weaker at a high temperature, it is possible to suppress the load from repeatedly loading on the MEA 11, and thus preventing degradation in the durability of the MEA 11, etc. is possible.

Also, it is possible to determine that the quantity of liquid in the anode flow channel is smaller when the impedance of the fuel cells is higher. That is, when the impedance of the fuel cells becomes higher, the difference between the increased pressure and the decreased pressure set corresponding to the output requested on the fuel cells is decreased, so that suppressing the load from repeatedly loading on the MEA 11 is possible, and thus preventing degradation in the durability of the MEA 11, etc. is possible.

Second Embodiment

For the fuel cell system in the first embodiment, when the temperature T of the fuel cell stack 2 becomes over a prescribed temperature Tth, or when the internal resistance R of the fuel cell stack 2 becomes over a prescribed Rth, the increase/decrease pressure differential Δp of the anode pressure is decreased. That is, corresponding to the temperature T of the fuel cell stack 2 or the internal resistance R of the fuel cell stack 2, the increase/decrease pressure differential Δp of the anode pressure is switched (see FIG. 4). That is, with the same requested load, one of two types of the increase/decrease pressure differential Δp of the anode pressure is selected and set corresponding to the temperature T of the fuel cell stack 2 or the internal resistance R of the fuel cell stack 2.

On the other hand, for the fuel cell system in the second embodiment, the smaller the quantity of liquid that there is in the anode flow channel, the smaller that the difference between the increased pressure and the decreased pressure will be. When the quantity of liquid in the anode flow channel is determined based on the temperature T of the fuel cell stack 2, the higher the temperature T of the fuel cell stack 2 is, or, when the quantity of liquid in the anode flow channel is determined based on the internal resistance R of the fuel cell stack 2, the increase/decrease pressure differential Δp of the anode pressure is decreased.

Figure 9:
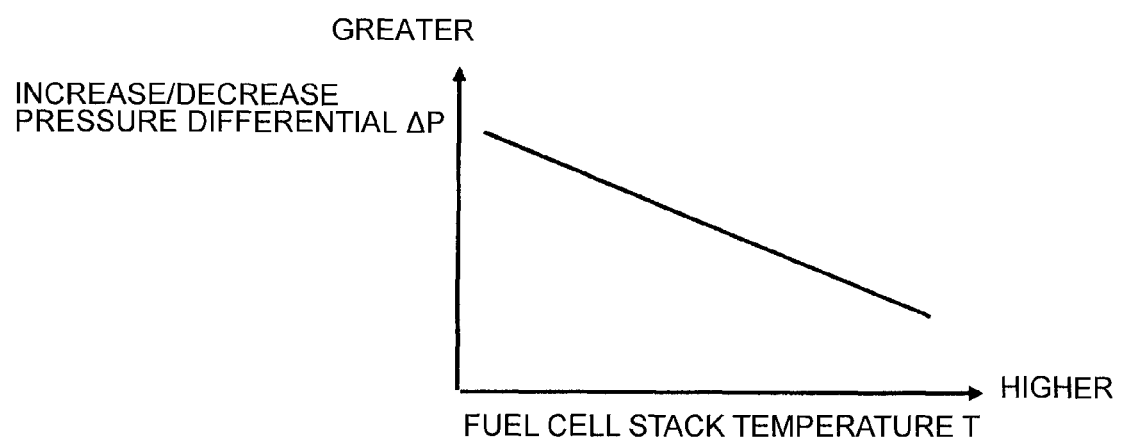
FIG. 9 is a graph conceptually illustrating the relationship between the temperature T of the fuel cell stack and the increase/decrease pressure differential $\Delta p$ of the anode pressure in the fuel cell system in accordance with a second embodiment.

FIG. 9 is a graph illustrating the relationship between the temperature T of the fuel cell stack 2 and the increase/decrease pressure differential Δp of the anode pressure in the fuel cell system in the second embodiment. As shown in FIG. 9, the higher the temperature T of the fuel cell stack 2 is, the greater the increase/decrease pressure differential Δp of the anode pressure is decreased.

Figure 10:
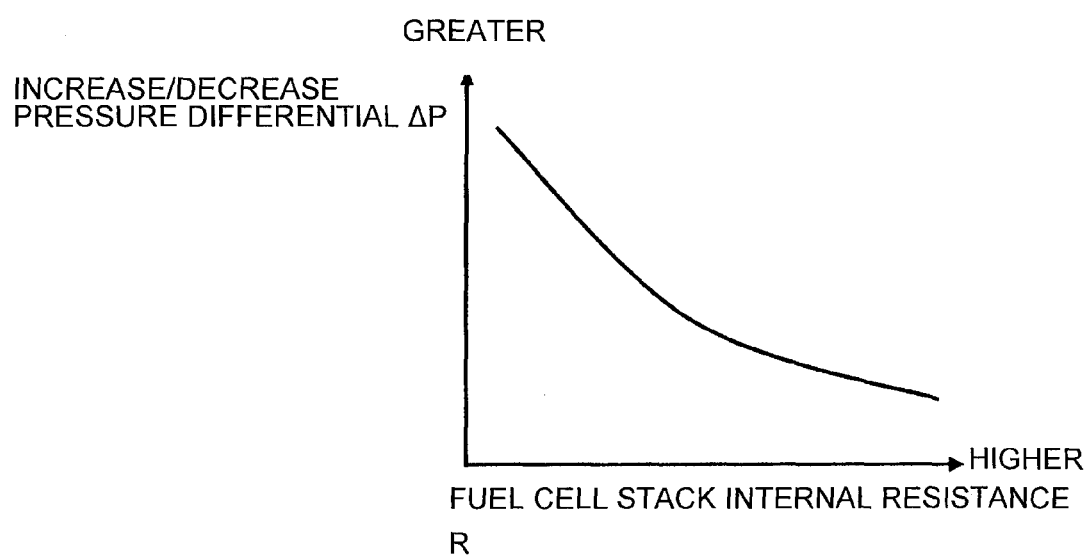
FIG. 10 is a graph conceptually illustrating the relationship between the internal resistance R of the fuel cell stack and the increase/decrease pressure differential $\Delta p$ of the anode pressure in the fuel cell system of the second embodiment.

FIG. 10 is a graph illustrating the relationship between the internal resistance R of the fuel cell stack 2 and the increase/decrease pressure differential Δp of the anode pressure in the fuel cell system of the second embodiment. As shown in FIG. 10, the higher that the internal resistance R of the fuel cell stack 2 is, the smaller the increase/decrease pressure differential Δp of the anode pressure is set.

In the above, for the fuel cell system in the second embodiment, when the quantity of liquid in the anode flow channel becomes smaller, the difference between the increased pressure and the decreased pressure is decreased. When the quantity of liquid in the anode flow channel is small, there is no need to increase the difference between the increased pressure and the decreased pressure for exhausting the liquid. Consequently, it is possible to efficiently decrease the difference between the increased pressure and the decreased pressure corresponding to the quantity of liquid.

Third Embodiment

For the fuel cell system in the first embodiment, when the temperature T of the fuel cell stack 2 becomes over a prescribed temperature Tth, or when the internal resistance R of the fuel cell stack 2 becomes over a prescribed Rth, a determination is made that the quantity of liquid in the anode flow channel becomes less than the prescribed quantity, and the increase/decrease pressure differential Δp of the anode pressure is decreased. However, when the temperature T of the fuel cell stack 2 becomes over the prescribed temperature Tth, or when the internal resistance R of the fuel cell stack 2 becomes over the prescribed resistance Rth, even when the quantity of liquid in the anode flow channel in the power generation region of the fuel cell stack 2 becomes less than the prescribed quantity, the liquid may still be left in the area out of the power generation region. Also, even when the liquid is discharged out of the fuel cell stack 2, the liquid may still be left in the anode gas exhausting pipeline 35 or in the buffer tank 36. In this state, if the increase/decrease pressure differential Δp of the anode pressure is decreased, the liquid may still return to the anode flow channel in the power generation region.

For the fuel cell system in the third embodiment, after the lapse of a prescribed time from the time when the quantity of liquid in the anode flow channel becomes less than the prescribed quantity, the increase/decrease pressure differential Δp of the anode pressure is decreased. More specifically, when the quantity of liquid in the anode flow channel is determined based on the temperature T in the fuel cell stack 2, after the lapse of a prescribed time from the time when the temperature T of the fuel cell stack 2 becomes over the prescribed temperature Tth, or, when the quantity of liquid in the anode flow channel is determined based on the internal resistance R of the fuel cell stack 2, after the lapse of a prescribed time from the time when the internal resistance R of the fuel cell stack 2 becomes over the prescribed resistance Rth, the increase/decrease pressure differential Δp of the anode pressure is decreased. Here, the prescribed time may be set as the time when a determination can be made that the liquid is discharged out of the fuel cell stack 2, or the prescribed time may be set as the time when a determination can be made that the liquid that has flown into the buffer tank 36 via the anode gas exhausting pipeline 35 has been discharged from the buffer tank 36.

Figure 11:
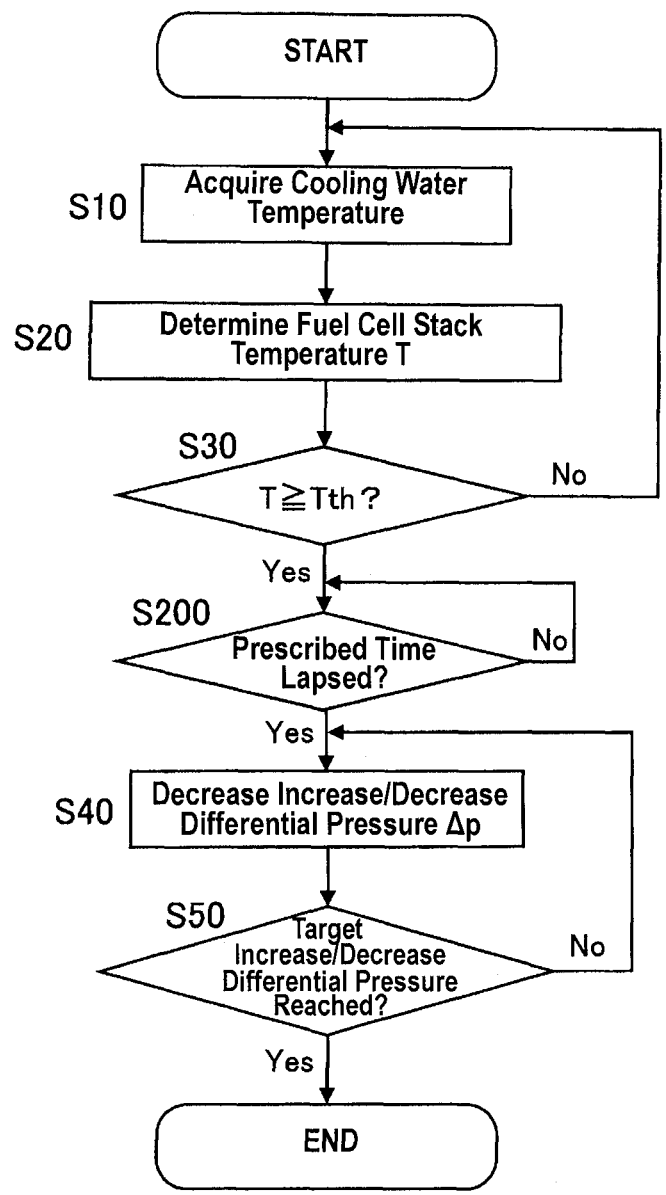
FIG. 11 is a flow chart illustrating a process executed by the controller of the fuel cell system of a third embodiment, where the quantity of liquid in the anode flow channel is determined based on the temperature of the fuel cell stack, and a control is carried out to decrease the increase/decrease pressure differential $\Delta p$ of the anode pressure.

FIG. 11 is a flow chart illustrating the control in the fuel cell system of the third embodiment, wherein the quantity of liquid in the anode flow channel is determined based on the temperature of the fuel cell stack 2, and a control is carried out to decrease the increase/decrease pressure differential Δp of the anode pressure. The same reference numerals as those in the flow chart shown in FIG. 5 are used to represent the same steps of the operation. Consequently, they will not be explained in detail again.

In step S30, when a determination is made that the temperature T of the fuel cell stack 2 is over the prescribed temperature Tth, and the process proceeds to step S200. In step S200, a determination is made regarding whether a prescribed time has lapsed from the time when the temperature T of the fuel cell stack 2 becomes over the prescribed temperature Tth. When a determination is made that the prescribed time has not lapsed, the operation stays in S200 for standby. On the other hand, if a determination is made that the prescribed time has lapsed, the process proceeds to step S40.

Figure 12:
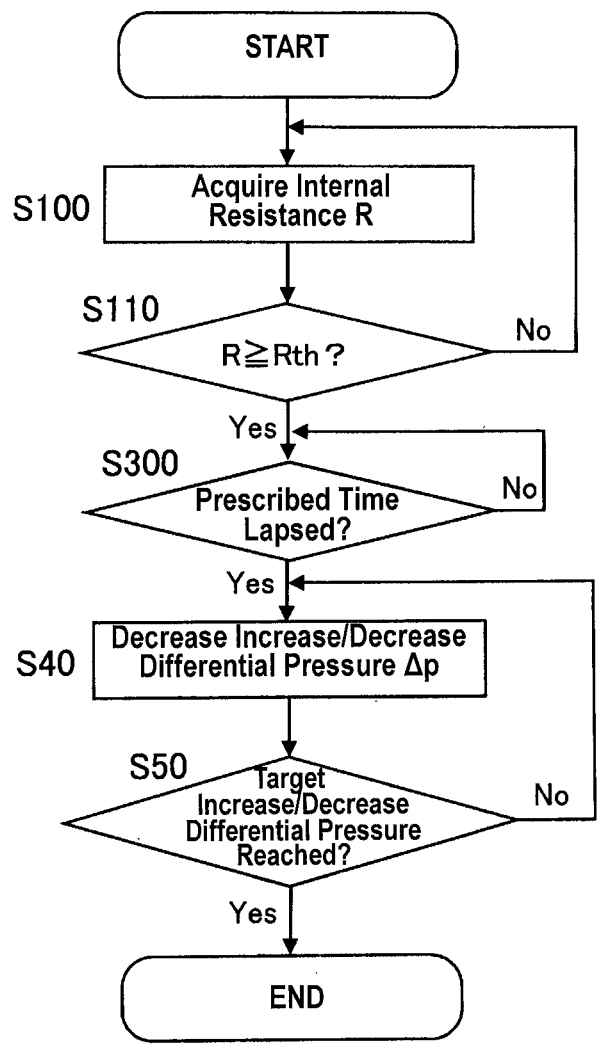
FIG. 12 is a flow chart illustrating a process executed by the controller of the fuel cell system of the third embodiment, where the quantity of liquid in the anode flow channel is determined based on the internal resistance of the fuel cell stack, and a control is carried out to decrease the increase/decrease pressure differential Δp of the anode pressure.

FIG. 12 is a flow chart illustrating the control in the fuel cell system of the third embodiment, wherein the quantity of liquid in the anode flow channel is determined based on the internal resistance of the fuel cell stack 2, and the control is carried out to decrease the increase/decrease pressure differential Δp of the anode pressure.

In step S110, if a determination is made that the internal resistance R of the fuel cell stack 2 is over the prescribed resistance Rth, the process proceeds to step S300. In step S300, a determination is made regarding whether a prescribed time has lapsed from the time when the internal resistance R of the fuel cell stack 2 becomes over the prescribed resistance Rth. When a determination is made that the prescribed time has not lapsed, the operation stays in step S300 for standby. On the other hand, when a determination is made that the prescribed time has lapsed, the process proceeds to step S40.

As explained above, according to the fuel cell system in the third embodiment, after the lapse of the prescribed time from the time when the quantity of liquid in the anode flow channel becomes less than the prescribed quantity, the difference between the increased pressure and the decreased pressure is decreased corresponding to the output requested on the fuel cells. As a result, when the liquid that cannot be detected according to temperature or the like of the fuel cell stack 2 is left in the fuel cell stack 2, in the anode gas exhausting pipeline 35 or in the buffer tank 36, the difference between the increased pressure and the decreased pressure is decreased, so that it is possible to prevent the liquid from returning to the anode flow channel in the power generation region.

The present invention is not limited to the first through third embodiments described above. For example, in the above, an explanation has been made for the case in which the fuel cell system is carried on a vehicle. However, the fuel cell system may also be used in various other applications other than the vehicles.

In the embodiments explained above, based on the temperature of the fuel cell stack 2 and the internal resistance (the impedance) of the fuel cell stack 2, the quantity of liquid in the anode flow channel is determined. However, one may also adopt a scheme in which a sensor for detecting the quantity of liquid in the anode flow channel is set to directly detect the quantity of liquid in the anode flow channel.

In understanding the scope of the present invention, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell system comprising:
   a fuel cell configured to receive anode gas and cathode gas to generate electric power;
   a control valve configured to control pressure of the anode gas being fed to the fuel cell through an anode flow channel; and
   a controller programmed to
      control the control valve to pulsate the pressure of the anode gas flowing through the anode flow channel in an area downstream of the control valve,
      determine a quantity of liquid in the anode flow channel,
      set an anode pressure differential value defining a difference between an-upper limit value and a lower limit value of the anode gas during the pulsing of the pressure of the anode gas, the anode pressure differential value being based on a requested fuel cell output and the determined quantity of liquid,
      the controller being programmed to set the anode pressure differential value to be smaller as the quantity of liquid in the anode flow channel is determined to become smaller.

2. The fuel cell system according to claim 1, further comprising
   a buffer component configured to store anode-off gas emitted from the fuel cell.

3. The fuel cell system according to claim 1, wherein
   the controller is programmed to set the anode pressure differential value to decrease and increase continuously as the quantity of liquid in the anode flow channel is determined to decrease and increase.

4. The fuel cell system according to claim 1, further comprising
   the controller determines the quantity of liquid in the anode flow channel to be smaller as a temperature of the fuel cell is determined to become higher.

5. The fuel cell system according to claim 4, wherein
   the controller sets the anode pressure differential value to be smaller upon a prescribed time lapsing after the quantity of liquid in the anode flow channel is determined to be smaller than a threshold quantity, the threshold quantity being larger than zero.

6. The fuel cell system according to claim 4, further comprising
   a buffer component configured to store anode-off gas emitted from the fuel cell.

7. The fuel cell system according to claim 1, wherein
   the controller determines the quantity of liquid in the anode flow channel to be smaller as an impedance of the fuel cell is determined to become higher.

8. The fuel cell system according to claim 7, wherein
   the controller sets the anode pressure differential value to be smaller upon a prescribed time lapsing after the quantity of liquid in the anode flow channel is determined to be smaller than a threshold quantity, the threshold quantity being larger than zero.

9. The fuel cell system according to claim 7, further comprising
   a buffer component configured to store anode-off gas emitted from the fuel cell.

10. The fuel cell system according to claim 1, wherein
    the controller sets the anode pressure differential value to be smaller upon a prescribed time lapsing after the quantity of liquid in the anode flow channel is determined to be smaller than a threshold quantity, the threshold quantity being larger than zero.

11. The fuel cell system according to claim 10, further comprising
    a buffer component configured to store anode-off gas emitted from the fuel cell.

12. A fuel cell system comprising:
    a fuel cell configured to receive anode gas and cathode gas to generate electric power;
    an anode flow channel arranged to feed the anode gas to the fuel cell;
    a control valve arranged in the anode flow channel, the control valve being configured to have an adjustable opening degree;
    a pressure sensor arranged in the anode flow channel between the control valve and the fuel cell, the pressure sensor being configured to detect a pressure of the anode gas in the anode flow channel; and
    a controller arranged to receive a signal from the pressure sensor indicating a detected anode gas pressure, the controller being programmed to
       set an upper limit value and a lower limit value of the anode gas pressure based on a requested fuel cell output, the upper limit value and the lower limit value defining an anode pressure differential value equal to a difference between the upper limit value and the lower limit value, and
       control the opening degree of the control valve such that the detected anode gas pressure is pulsated periodically between the upper limit value and the lower limit value,
       determine a quantity of liquid in the anode flow channel and set the upper limit value and the lower limit value such that the anode pressure differential value decreases in response to a decrease of the determined quantity of liquid in the anode flow channel.

13. The fuel cell system according to claim 12, wherein
    the controller sets the upper limit value and the lower limit value such that the anode pressure differential value increases as the requested fuel cell output increases.

14. The fuel cell system according to claim 12, wherein
    the controller decreases the anode pressure differential value by lowering the upper limit value.

15. The fuel cell system according to claim 12, wherein
    the controller determines the quantity of liquid in the anode flow channel based on a temperature of the fuel cell, the quantity of liquid in the anode flow channel being determined to be smaller as the temperature of the fuel cell becomes higher.

16. The fuel cell system according to claim 12, wherein the controller determines the quantity of liquid in the anode flow channel based on an impedance of the fuel cell, the quantity of liquid in the anode flow channel being determined to be smaller as the impedance of the fuel cell becomes higher.

17. The fuel cell system according to claim 12, wherein the controller sets the upper limit value and the lower limit value such that the anode pressure differential value decreases upon a prescribed time lapsing after the quantity of liquid in the anode flow channel is determined to be less than a prescribed quantity.

18. The fuel cell system according to claim 12, further comprising
a buffer component configured to store anode-off gas emitted from the fuel cell.

19. A fuel cell system comprising:
a fuel cell configured to receive anode gas and cathode gas to generate electric power;
a control valve configured to control pressure of the anode gas being fed to the fuel cell through an anode flow channel; and
a controller programmed to
control the control valve to pulsate the pressure of the anode gas flowing through the anode flow channel in an area downstream of the control valve,
determine if a quantity of liquid in the anode flow channel is smaller than a threshold quantity, the threshold quantity being larger than zero,
set an anode pressure differential value defining a difference between an upper limit value and a lower limit value of the anode gas during the pulsing of the pressure of the anode gas, the anode pressure differential value being based on a requested fuel cell output and the result of the determination regarding the quantity of liquid in the anode flow channel, the controller setting the anode pressure differential value to be a smaller differential value when the quantity of liquid in the anode flow channel is determined to be smaller than the threshold quantity than when the quantity of liquid in the anode flow channel is determined to be equal to or larger than the threshold quantity.

20. The fuel cell system according to claim 19, wherein
upon the controller determining that the quantity of liquid in the anode flow channel has changed from being equal to or larger than the threshold quantity to being smaller than the prescribed value, the controller waits for a prescribed amount of time before decreasing the anode pressure differential value.

21. The fuel cell system according to claim 19, further comprising
the controller determines the quantity of liquid in the anode flow channel to be smaller as a temperature of the fuel cell is determined to become higher.

22. The fuel cell system according to claim 19, wherein
the controller determines the quantity of liquid in the anode flow channel to be smaller as an impedance of the fuel cell is determined to become higher.

* * * * *